(12) United States Patent
Jou

(10) Patent No.: US 6,466,606 B1
(45) Date of Patent: Oct. 15, 2002

(54) METHOD AND APPARATUS FOR PERFORMING SEARCH ACQUISITION IN A MULTI-CARRIER COMMUNICATION SYSTEM

(75) Inventor: Yu-Cheun Jou, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/470,224

(22) Filed: Dec. 22, 1999

(51) Int. Cl.$^7$ .................................................. H04K 7/00
(52) U.S. Cl. ....................................... 375/130; 375/260
(58) Field of Search ................................. 375/130, 136, 375/140, 142, 143, 144, 147, 148, 150, 152, 367, 366, 368, 365, 260; 370/342, 500, 503, 491, 515

(56) References Cited

U.S. PATENT DOCUMENTS

| 4,901,307 A | 2/1990 | Gilhousen et al. ............. 370/18 |
| 5,056,109 A | 10/1991 | Gilhousen et al. ............. 375/1 |
| 5,101,501 A | 3/1992 | Gilhousen et al. ............. 455/33 |
| 5,103,459 A | 4/1992 | Gilhousen et al. ............. 375/1 |
| 5,109,390 A | 4/1992 | Gilhousen et al. ............. 375/1 |
| 5,627,835 A | 5/1997 | Witter ........................ 370/320 |
| 5,644,591 A | * 7/1997 | Sutton |
| 5,805,648 A | * 9/1998 | Sutton ........................ 375/367 |

FOREIGN PATENT DOCUMENTS

WO  9604716  2/1996

* cited by examiner

*Primary Examiner*—Jean Corrielus
(74) *Attorney, Agent, or Firm*—Philip Wadsworth; Kent D. Baker; S. Hossain Beladi

(57) ABSTRACT

A method and apparatus to search for a traffic channel in a multi-carrier spread spectrum communication network. In this first embodiment, all three pilot signals are transmitted with equal power from the base station. The remote station can noncoherently combine the received energy of all three-pilots on a time hypothesis. This will reduce the value of M (the noncoherent accumulation time) by a factor of three. Thus the mean acquisition time is shortened by a factor of three with the same probability of detection and false alarm as a signal carrier (1x) system, if each pilot is equivalent to a 1x pilot in power. Note that the number of operations (i.e., complexity) is the same as that for a 1x system, but the time elapsed is shortened by a factor of 3.

16 Claims, 7 Drawing Sheets

METHOD AND APPARATUS FOR PERFORMING SEARCH ACQUISITION IN A MULTI-CARRIER COMMUNICATION SYSTEM

BACKGROUND OF THE INVENTION

1. Field of the Invention

The present invention relates to communications. More particularly, the invention concerns a method and apparatus for acquiring a base station's transmission signal in a multi-carrier spread spectrum communication network.

2. Description of the Background Art

The use of code division multiple access (CDMA) modulation is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

Path diversity is obtained in CDMA systems by providing multiple signal paths through simultaneous links between a remote station and two or more cell-sites. Furthermore, path diversity may be obtained by exploiting this multi-path environment through spread spectrum processing, thereby allowing signals on the same frequency arriving with different propagation delays to be received and processed separately. Examples of path diversity are illustrated in U.S. Pat. No. 5,101,501, issued Mar. 31,1992, entitled "SOFT HANDOFF IN A CDMA CELLULAR TELEPHONE SYSTEM," and U.S. Pat. No. 5,109,390, issued Apr. 28, 1992, entitled "DIVERSITY RECEIVER IN A CDMA CELLULAR TELEPHONE SYSTEM," both assigned to the assignee of the present invention and incorporated by reference herein. Further, by CDMA's inherent nature of being a wideband signal, it offers a form of frequency diversity by spreading the signal energy over a wide bandwidth. Therefore, frequency selective fading affects only a small part of the CDMA signal bandwidth.

Fading can have deleterious effects on signals but can be controlled to a certain extent by controlling transmitter power. A system for cell-site and remote station power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE, TELEPHONE SYSTEM," Ser. No. 07/433,031, filed Nov. 7, 1989, now U.S. Pat. No. 5,056,109 assigned to the assignee of the present invention and incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM," assigned to the assignee of the present invention and also incorporated by reference herein. In general, the fading effects for related carriers in a multi-carrier communication network are approximately the same.

In the patents mentioned above, a pilot signal is used to acquire a base station's transmission signal. Acquisition means that the remote station detects and verifies the existence of such a signal. Detection means that a signal is present and the remote station detects it. The remote station is able to lock onto the pilot signal more easily than other signals because it is unmodulated by data and is usually transmitted at a higher power level than other signals. A pilot signal is an unmodulated, direct-sequence spread spectrum signal transmitted by a base station or remote station. Generally, a pilot signal provides a phase reference for coherent demodulation of a traffic channel, but may also be used for signal strength comparisons between base stations. Using a pilot signal enables a station to acquire a carrier provided within the traffic channel from a local base station communication network in a timely manner. The remote station gets synchronization information and relative signal power information regarding the carrier from the received pilot signal. The remote station may receive signals from multiple base stations in the network and more than one multipath from each base station. Multipath refers to the possible multiple signals arriving at a receiver antenna at different times. Signals that are in phase will add, and signals that are out of phase will cancel one another.

Scanning across an entire code domain in a uniform manner introduces intolerable delays, so remote stations usually scan pilot signals selectively. For example, a remote station may search around pilot signal offsets in active, candidate, and remaining lists. Offset refers to the different time offset for a signal. A search window, typically between 4 and 130 chips, is specified for each pilot signal offset. The remote station detects a signal by looking at the pilot signal energy on the corresponding time offset.

Further, a traffic channel between a remote station and a base station may comprise one or multiple carriers. A carrier is the underlying frequency or frequencies that are used to carry information. They are modulated through one or more modulation techniques to impose information on a signal. For example, a multi-carrier forward traffic channel, also referred to herein as a forward link (FL), may define a mode of operation used with a spreading rate S where S>1, and that uses X adjacent direct-spread radio frequency (RF) carriers. Interleaved data may be demultiplexed onto each of the X adjacent carriers. For example, FIG. 1 shows a diagram used to illustrate three (X=3) frequency bands 102, 104, and 106 of width 1.25 MHz, common to some CDMA communication networks. From each frequency band, a carrier is selected to form a multi-carrier (MC) forward link 108 that facilitates communication between one or more base stations and a remote station.

Regardless of whether a traffic channel provides a single carrier or multi-carriers, a search of pilot signals to find a phase reference for coherent demodulation of a candidate traffic channel is currently conducted the same way. The mobile station generates a local version of a pilot signal pseudonoise (PN) sequence with a guessed time offset (called a hypothesis), correlates this local PN sequence with the received signal for a number (N) of PN chips, and noncoherently combines the energy of M such coherently integrated energies. The result is compared to a first threshold (T1). This is the first dwell in a multiple-dwell process. If the accumulated energy is below T1, the mobile station considers that there is no signal present on that time hypothesis and moves to the next hypothesis. This is also referred to as an early dump. Otherwise, the mobile station performs verification on that time hypothesis by using a similar procedure, typically with a different (usually larger) value of N and M. If the accumulated energy obtained in the verification is below a threshold of T2, then the time hypothesis is discarded. Otherwise, the mobile station performs further verification. If the accumulated energy surpasses the threshold in the final verification, then acquisition is declared on that time hypothesis and a demodulator is assigned to demodulate the signal at that time hypothesis. FIG. 2 illustrates such a method 200.

The method 220 starts in task 202 and yields the results discussed below with reference to FIG. 3. A window is searched or "swept" in task 204. If a hypothesis contained in the window does not exceed a first detection threshold (FTV) as shown in task 206, and if all hypotheses in the window have not been searched in task 208 for the specified parameters, then the search is repeated using a larger window in task 210. If all hypotheses for a selected set of parameters have been searched in task 208, then hypotheses for a next set of selected parameters are used in task 212 and the sweep is repeated in task 204.

However, if there are points on the calculated energy curve which do exceed the UTV, then the method 200 proceeds to a validation phase shown as task 214. In task 214, the same large window is swept again, but this time the calculated energy is compared against a second threshold value, or validation threshold (STV), in task 216. If the maximum energy detected is not greater then the STV, the method 200 returns to task 208 and a next large window is swept. If the detected energy exceeds the STV, and if the result has been validated for N consecutive windows of data, then a pilot has been acquired and the method 200 ends in task 220. If fewer than N validation tests have been conducted, then the method 200 returns to task 214 and the large window is swept again. The value of N may be set to any value, such as 20, that is desired to assure within a reasonable certainty that a false acquisition has not occurred.

An example of using a fixed window size follows. FIG. 3 illustrates a graph of energy values versus the chip time hypothesis. In the illustrated embodiment, the window is 56 chips in width. However, a 64 chip width or other sized window may be used. The window illustrates the use of a two level threshold test. The thresholds denoted are a two detection thresholds and a validation threshold. When a peak is detected, the searcher controller concentrates on that peak and tests hypotheses close to the hypothesis that gave rise to the detected peak. Further discussion of fixed window search methods may be found in U.S. Pat. No. 5,805,648, issued Sep. 8, 1998, entitled "METHOD AND APPARATUS FOR PERFORMING SEARCH ACQUISITION IN A CDMA COMMUNICATION SYSTEM," and U.S. Ser. No. 08/509,721, filed Jul. 31, 1995, now U.S. Pat. No. 5,805,648 entitled "METHOD AND APPARATUS FOR PERFORMING SEARCH ACQUISITION IN A CDMA COMMUNICATION SYSTEM," both of which are assigned to the assignee of the present invention. In a MC system, this process is repeated for a pilot signal associated with each carrier.

In an ideal system where the time for setting up the search hardware is zero, a method providing one hypothesis for searching a carrier would be fine. Realistically, because it takes time to set up the hardware to conduct a search, "windows" of search hypotheses are usually used. Generally speaking, the longer the time required for setting up the hardware, the larger the size of the window used. In complex systems, a searcher is required to search a window of many hypotheses. Upon finding a candidate synchronized sequence, the searcher will repeat the search using a smaller window to verify the synchronization. For networks using a single carrier, this method may be acceptable. But in a MC network, this methodical approach results in a long time delay in acquiring all of the carriers.

What is needed is an invention that provides a method and apparatus shortening the time required to identify and access a traffic channel's carriers as used in a MC communications network. The invention should also reduce the resource requirements for performing such a routine.

BRIEF DESCRIPTION OF THE DRAWING

The nature, objects, and additional advantages of the invention will become more apparent to those skilled in the art after considering the following detailed description in connection with the accompanying drawings, in which like reference numerals designate like parts throughout, and wherein.

DETAILED DESCRIPTION OF THE EXEMPLARY EMBODIMENTS

Figure 1:
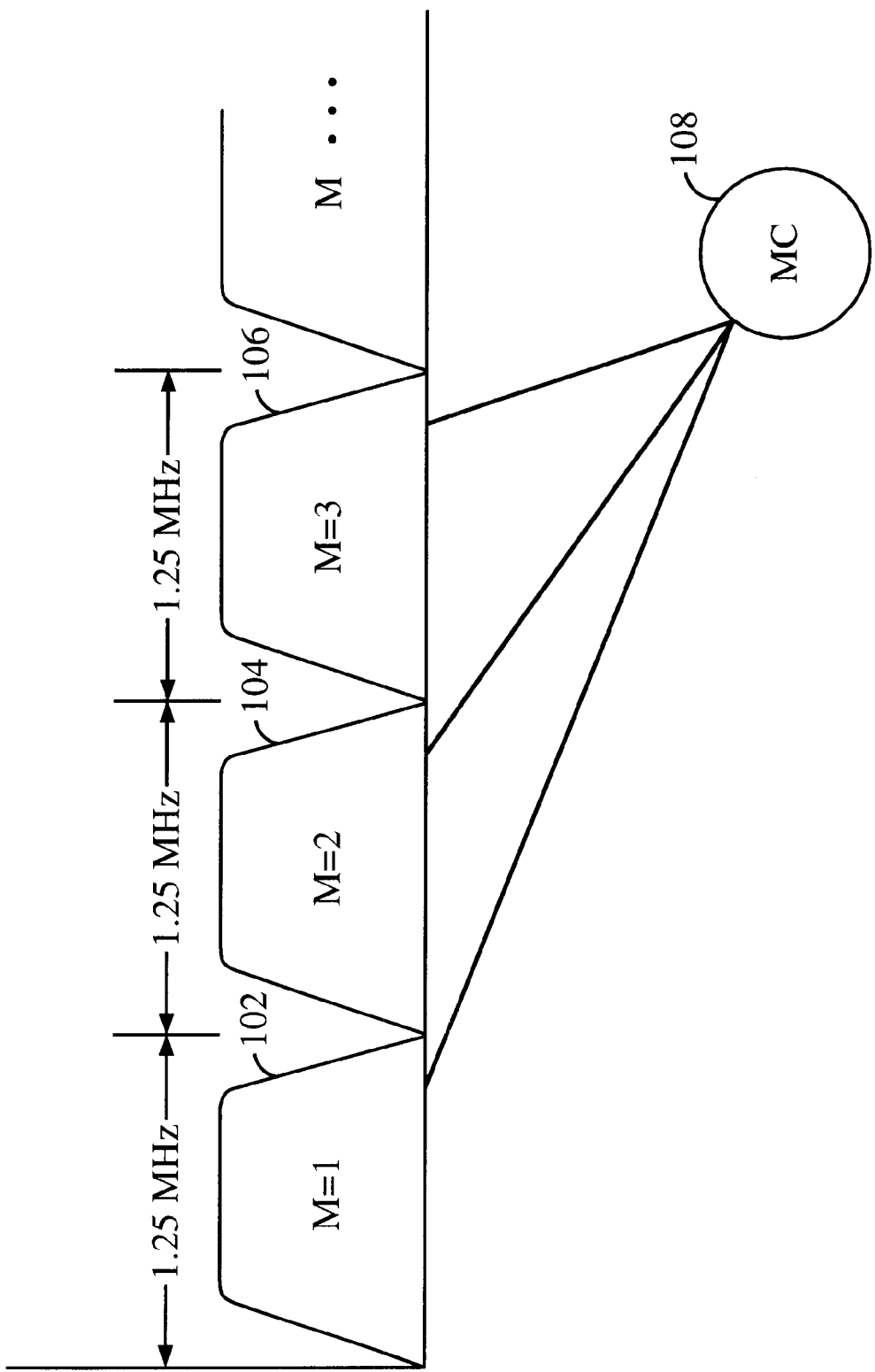
FIG. 1 is a diagram of a prior art multi-carrier (MC) configuration.
Figure 2:
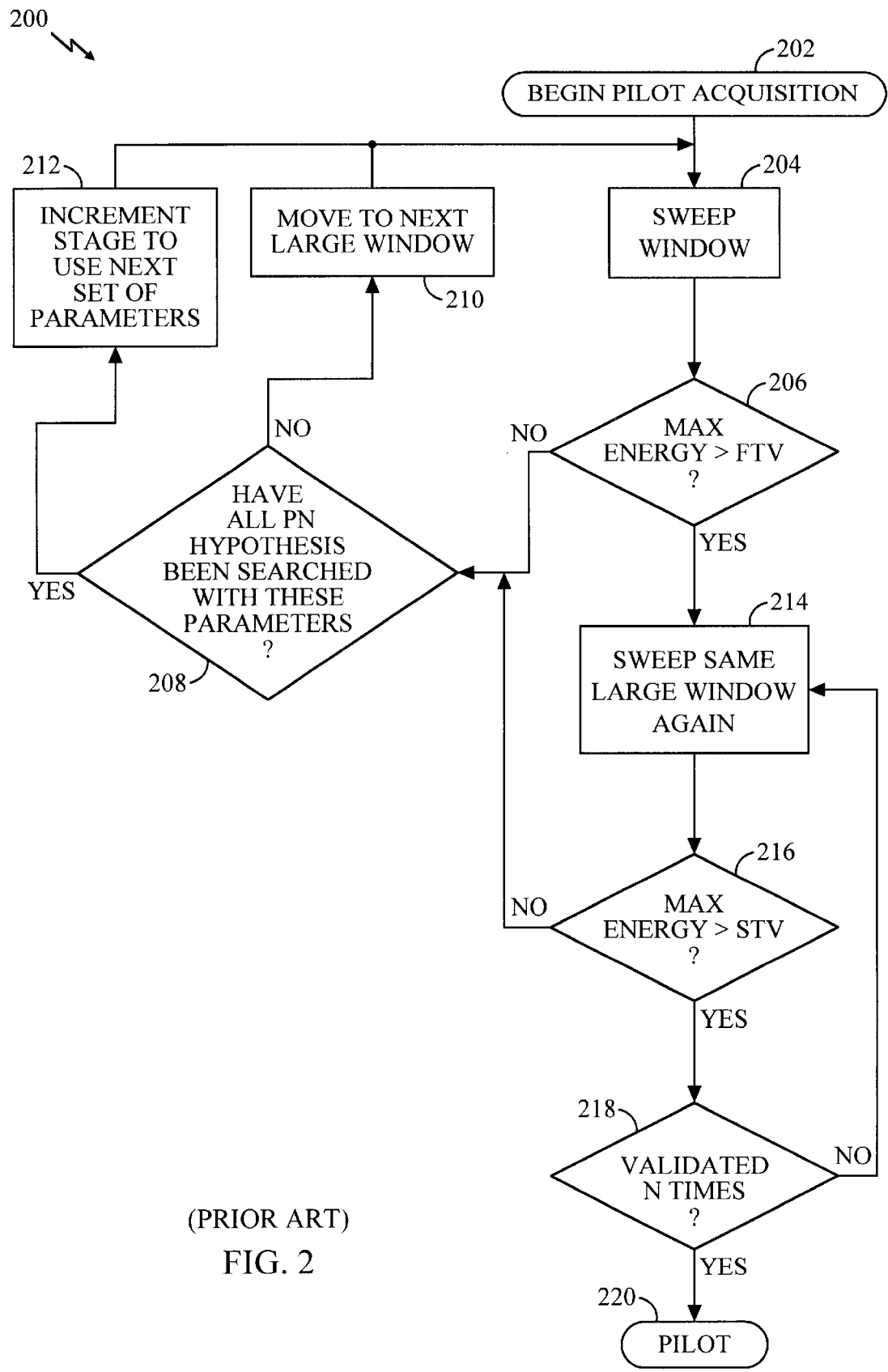
FIG. 2 is a flowchart illustrating a fixed window size implementation of a prior art search,method.
Figure 3:
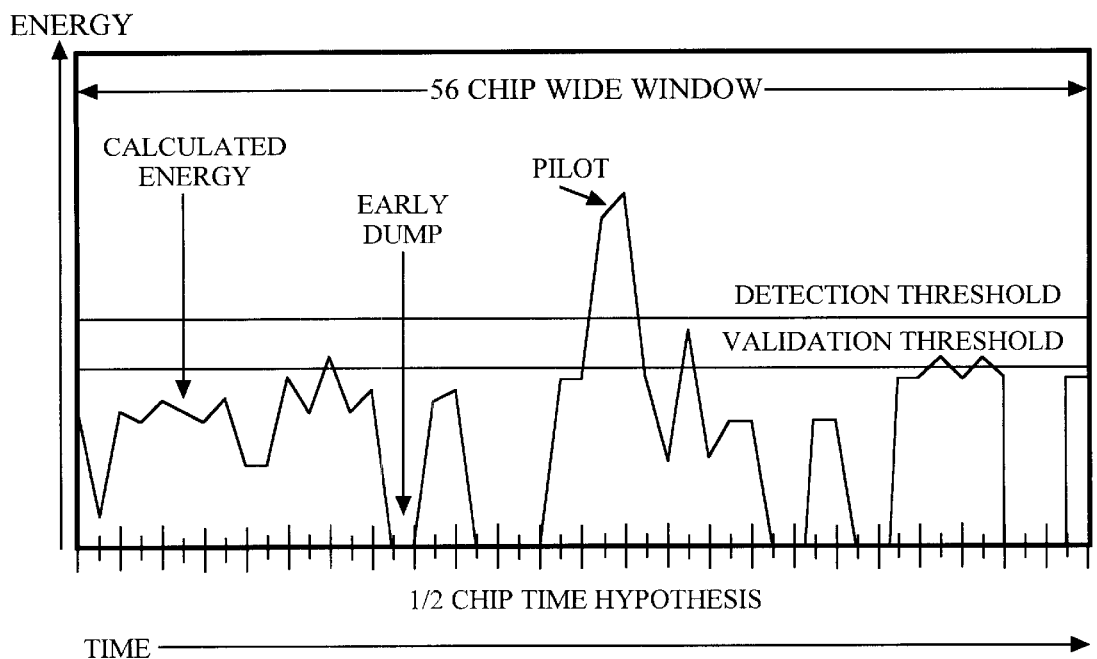
FIG. 3 is a chart showing the energy versus chip offset for the prior art fixed window search method of FIG. 2.
Figure 6:
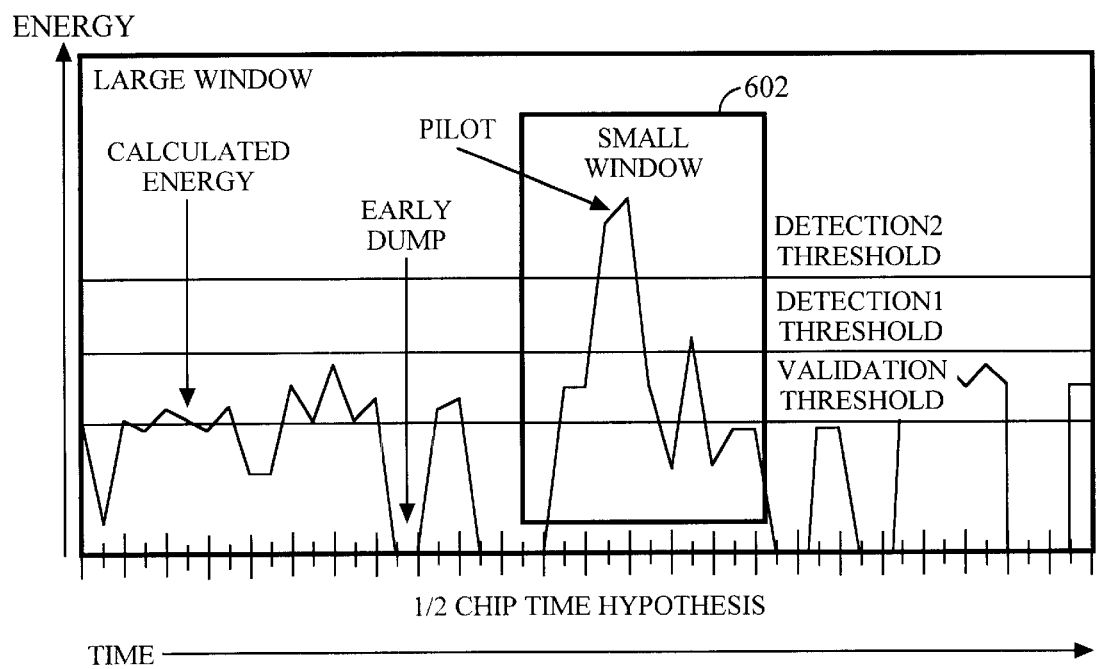
FIG. 6 illustrates the energy versus chip offset in accordance with one embodiment of the present invention, wherein energy of a pilot signal over time within a large window and a small window 602 with respect to a validation threshold, a detections threshold and a detection 2 threshold is shown.

The present invention is a method and apparatus that reduces the acquisition time for identifying and accessing the carriers used in a communications network utilizing MC technology. By reducing the acquisition time, valuable network resource savings are realized.

In one embodiment, the present invention comprises a method to reduce the search time for acquiring multiple carriers by using sequentially smaller search windows to identify a first carrier accessible by a user or remote station. Once a first carrier has been identified, the smaller of the sequentially smaller search windows are used to identify additional related carriers accessible by the user. In another embodiment, only the smallest of the sequentially smaller search windows used to identify the first carrier is employed to identify the additional related carriers. A related carrier is one of multiple carriers accessible by a user in a multi-carrier communications network. In another embodiment, after the first carrier has been acquired, a signal quality metric for the first carrier is reported from the user to a transmission station, and a quality metric for the additional related carriers is determined based upon the signal quality metric for the first carrier.

In performing the above method, the phase of a pilot channel is verified by first determining a set of calculated energy values for a first predetermined large window set of PN sequence hypotheses. These calculated energy values are compared against a first value. If acceptable, a second set of calculated energy values for a predetermined "small" window set of PN sequence hypotheses is determined, wherein the small window PN sequence hypotheses are a subset of the large window set of PN sequence hypotheses. The phase of the pilot channel is determined in accordance with the second set of calculated energy values. This process may be repeated by using sequentially smaller search windows until a desired level of acquisition certainty is obtained.

In still another embodiment, the invention may be implemented to provide an apparatus for reducing the search time for acquiring multiple carriers. The apparatus may comprise a demodulator for demodulating a signal associated with a first carrier. This demodulation provides signal metrics that are communicated to a digital signal processing unit. The digital signal processing unit is communicatively coupled to at least the demodulator and is capable of executing instructions to perform the methods of the invention.

In another embodiment, the invention may be implemented to provide an article of manufacture comprising a data storage device tangibly embodying a program of machine-readable instructions executable by a digital signal processing apparatus to perform method steps for reducing the search time for acquiring multiple carriers.

The invention affords its users with a number of distinct advantages as found in its various embodiments. For example, one advantage is that it minimizes the total time for acquisition of multiple carriers by speeding up the search methodology without incurring excessive penalties for false acquisition. Another advantage is the invention allows a signal quality metric for a related carrier to be determined using only the signal quality metric reported for the first carrier. Yet another advantage is that the invention reduces the network resources necessary to acquire the multiple carriers.

FIGS. 4–8 illustrate examples of various method and apparatus aspects of the present invention. For ease of explanation, but without any limitation intended, these examples are described in the context of a digital signal processing apparatus. A digital signal processing apparatus used to execute a sequence of machine-readable instructions as referred to above may be embodied by various hardware components and interconnections. Various arrangements for these digital data processing apparat uses will become apparent to anyone schooled in the art after reading the below description of the methods involved.

In a spread spectrum communication network, a pilot signal is used to synchronize a remote station in phase and frequency to the transmissions of a base station. In the exemplary embodiment, the spread spectrum communication network, also referred to as a system, is a CDMA direct-sequence spread spectrum communication system. However, a person skilled in the art will find that various changes and modifications may be made to adapt the invention to other wireless communication systems, such as TDMA systems, without departing from the scope of the invention. Examples of such a system are discussed in U.S. Pat. No. 5,056,109, issued Oct. 8, 1991 and entitled "METHOD AND APPARATUS FOR CONTROLLING TRANSMISSION POWER IN A CDMA CELLULAR MOBILE TELEPHONE SYSTEM," and U.S. Pat. No. 5,103,459, issued Apr. 7, 1992, and entitled "SYSTEM AND METHOD FOR GENERATING SIGNAL WAVEFORMS IN A CDMA CELLULAR TELEPHONE SYSTEM," both of which are incorporated by reference herein. In a direct-sequence spread spectrum communication system employing one or multiple carriers, transmitted signals are spread over a frequency band greater than the minimum bandwidth necessary to transmit the information by modulating a carrier wave by the data signal, then modulating the resulting signal again with a wide band spreading signal. In a pilot signal, the data may be viewed as an "all ones" sequence.

To communicate, a remote station must synchronize to received signals from one or more base stations in time, t, phase, $\phi$, and in frequency, $\omega$. The object of the searcher operation is to find the time of the received signal. After finding $\tau$, the phase and the frequency are found by using a demodulation element that has hardware for both phase and frequency tracking. A remote station finds the time of a received signal by testing a set of time hypotheses, referred to as a "window," and determining if one of the hypothetical time hypotheses, also referred to as offset hypotheses, is correct.

The present invention seeks to achieve a short mean acquisition time for acquiring a base station or stations signals. The value of the parameters M, N, T1 and T2 referred to above, used in difference stages of searching, are design parameters that can be traded off. To achieve a short mean acquisition time, a "searcher" usually has to achieve a certain probability of detection. This avoids missing a signal and having to wait for its next turn to be checked, while keeping the probability of a false alarm low, thereby to avoid wasting time on unnecessary verification. A false alarm occurs when a signal is not present but the remote station thinks that it is present. During initial acquisition, for example, when the remote station has no idea of the base station's transmit time, the remote station searches the entire PN sequence until a signal is acquired.

After a mobile station acquires a base station, or when it otherwise has some idea of the communication network time, the remote station will only have to search on time hypotheses in a window around each neighboring base station's given time offset. Generally, the PN offsets between neighboring base stations are communicated to the mobile station. The reason that the remote station needs to search in a window around each neighboring base station's time offset is because the ambiguity introduced by the remote station's location and relative distance to each cell site. This window is called the search window. The network determines the size of the search window from the coverage range of the base stations and communicates it to remote stations as a system parameter.

In General

In the exemplary embodiment, a MC system with three carriers is used as an example, although the concept applies to a MC system having a number of carriers. In this embodiment, a pilot is transmitted on each carrier frequency. These pilots have identical PN offsets. If these pilots were to be searched independently using the prior art method described above, the number of time hypotheses would be tripled and so would the mean acquisition time. This is similar to a direct-spread system with a chip rate that is three times faster.

However, there is a property in MC systems that can be used to reduce the mean acquisition time. The three carrier frequencies typically will be transmitted using the same transmit antenna at the base station. In this case, the path delay, path loss and multipath fading will be highly correlated, even identical, for all three frequencies.

Therefore, finding a pilot signal on one carrier frequency strongly suggests that it is also present on the other two, and vice versa.

Hardware Components and Interconnections

Figure 4:
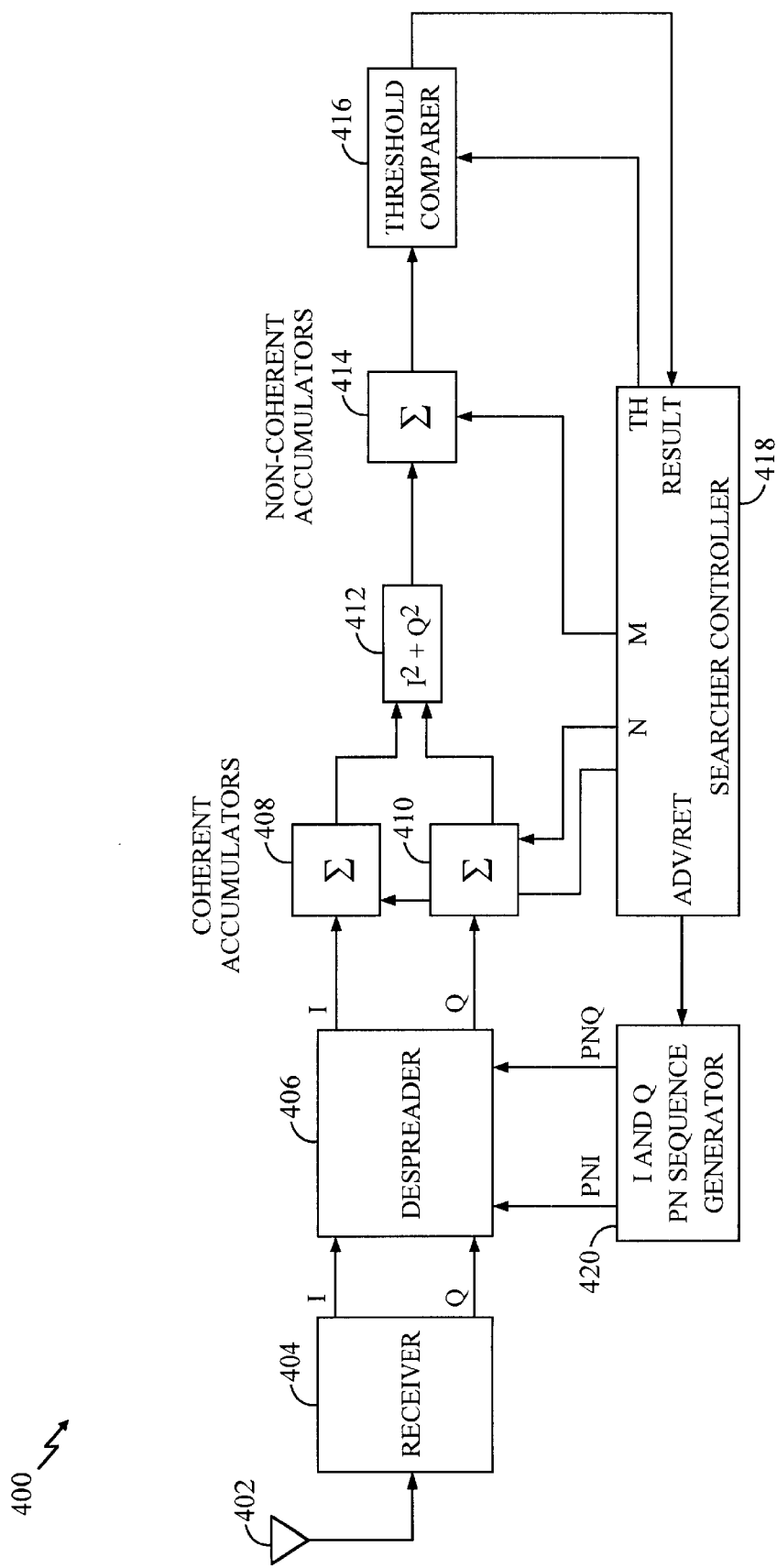
FIG. 4 is a simplified block diagram of an apparatus in accordance with one embodiment of the present invention.

FIG. 4 illustrates one embodiment of an apparatus 400 of the present invention. When powered up, a spread spectrum signal related to each carrier is received at antenna 402. Antenna 402 is one or more antennas that are used to receive a signal. The objective of the apparatus is to gain synchronization between pseudorandom noise (PN) sequences generated by PN sequence generator 420 and the received spread spectrum signals that are spread by identical PN sequences of unknown phase.

In the exemplary embodiment, a maximal length shift register sequence is used to spread the pilot signals. A PN generator generates the PN sequences for spreading and despreading, respectively, the pilot signals. Thus, the operation of obtaining synchronization between the codes used to despread the received pilot signals and the PN spreading code of the received pilot signals involves determining the time-offset of the shift register.

In FIG. 4, a signal is provided by antenna 402 to a receiver 404. Receiver 404 down-converts the signal and provides the signal to despreader 406. Despreader 406 multiplies the received signal by a PN code generated by PN generator 420. Due to the random noise nature of the PN codes the inner product of the PN code and the received signal are essentially zero except at the point of synchronization. However, due to a lack of exact synchronization on a chip level, and due to introduced noise, this is not the case. This may cause false alarm situations where the remote station believes it has successfully acquired a pilot signal when in realty it has not. In order to improve acquisition certainty, the test may be repeated a number of times. The number of times the test is repeated is determined by a searcher controller 418. Searcher controller 418 may be implemented as hardware, using a digital signal processing apparatus such as a microprocessor, micro-controller, a field programmable gate array, a logic array, or alternatively, in software controlling the logic device.

Searcher controller 418 provides an offset hypothesis to PN generator 420. In an exemplary embodiment, the received signals are modulated by quadrature phase shift keying (QPSK), so PN generator 420 provides a PN sequence for the I modulation component and a separate sequence for the Q modulation component to despreader 406. Despreader 406 multiplies the PN sequence by its corresponding modulation component and provides the two output component products to coherent accumulators 408 and 410.

Coherent accumulators 408 and 410 sum the product over the length of the product sequence. Coherent accumulators 408 and 410 are responsive to signals from searcher controller 418 for resetting, latching and setting the summation period. The sums of the products are provided from coherent accumulators 408 and 410 to squaring unit 412. Squaring unit 412 squares each of the sums and adds the squares together.

The sum of the squares is provided by squaring unit 412 to noncoherent accumulator 414. Noncoherent accumulator 414 determines an energy value from the output of squaring unit 412. Noncoherent accumulator 414 serves to counteract the effects of a frequency discrepancy between the base station transmit clocks and the remote station receive clock and aids in the detection statistic in a fading environment. If one knows that the frequency of the two clocks is exactly the same and that there are no deep fades, then the ideal approach is to integrate the sequence over the entire accumulation period in the form:

$$E = \left(\sum_{n=1}^{MN} I(n) PNI(n)\right)^2 + \left(\sum_{n=1}^{MN} Q(n) PNQ(n)\right)^2$$

where $PNI(n)$ and $PNQ(n)$ can be $\pm 1$.

If, however, there is a probability of frequency mismatch or fading, then the correlator sacrifices some of its detection statistic in order to have a more robust correlation technique of the form:

$$E = \sum_{k=1}^{M} \left\{ \left(\sum_{n=1}^{N} I(n+(k-1)N) \cdot PNI(n+(k-1)N)\right)^2 + \left(\sum_{n=1}^{N} Q(n+(k-1)N) \cdot PNQ(n+(k-1)N)\right)^2 \right\}$$

Searcher controller 418 provides the value M to noncoherent accumulator 414.

Noncoherent accumulator 414 provides the energy signal to threshold comparer 416. Comparer 416 compares the energy value to predetermined thresholds supplied by searcher controller 418. The results of each of the comparisons is then fed back to searcher controller 418. Searcher controller 418 examines the comparisons and determines whether the search range contains likely candidates for the correct offset. If yes, the window is rescanned using at least one additional and more narrowly defined search range (smaller range). After a pilot signal for a first carrier has been acquired, a smaller range is used to search for pilot signals related to other carriers that can also be acquired by the remote station.

Operation

In this first embodiment, all three pilot signals are transmitted with equal power from the base station. The remote station can noncoherently combine the received energy of all three pilots on a time hypothesis. This will reduce the value of M (the noncoherent accumulation time) by a factor of three. Thus the mean acquisition time is shortened by a factor of three with the same probability of detection and false alarm as a signal carrier (1×) system, if each pilot is equivalent to a 1×pilot in power. Note that the number of operations (i.e., complexity) is the same as that for a 1×system, but the time elapsed is shortened by a factor of 3.

In another embodiment, the transmit power of at least one of the three pilot signals is higher than that for the others. A method similar to that used in the first embodiment discussed above, with some adjustment in the value of M, N, T1 and T2 used for each pilot signal required to reflect the different pilot signal transmit power. However, in another embodiment, the search can also be primarily performed on the pilot signal with the highest power. The other pilot signals can be used for verification. The energy of the three pilot signals can be noncoherently combined to shorten the time used in verification. If the highest-powered pilot signal equivalent to a 1× pilot, then the mean acquisition time should be shorter than that for the 1× system with at least the same probability of detection and false alarm.

In other embodiments, combinations of methods discussed above can also be used. That is any number of pilot signals can be used in the first dwell and in the verification. The coherent and noncoherent integration time (N and M) and the thresholds (T1 and T2) are calculated accordingly.

In other embodiments, the three carrier frequencies may also be transmitted using two or three transmit antennas as opposed to the single antenna scenarios discussed above.

In these embodiments, signals sent from different antennas may experience independent fading, but the path loss and path delay will still be correlated. Thus, finding a pilot signal present at a time offset on one carrier frequency still strongly suggests the existence of signal at or around this time offset on other carrier frequencies. Note that fading is a short-term event and will be averaged out by the coherent and noncoherent integration in various stages, thus all allowing the methods used for single antenna applications and any combinations to be used. To accommodate small differences in path delay experienced by signals sent from different antennas, when a pilot signal is found to exist on a time hypothesis, a small window around that time hypothesis should be checked for any pilot signals sent on a different antenna. For example, if method 2 is used and the first pilot is detected at time hypothesis t, then the second pilot should be checked at, say, ±2 chips around t, assuming the first and second pilot are transmitted using different antennas. This requires longer verification time and thus longer mean acquisition time as compared to the case above. However, it is still much shorter than the case where three pilots are treated totally independently, since the check on the second or third pilot is done only when the first pilot is detected at a time hypothesis (this occurs at a small fraction of the total number of hypotheses). For example, assume the search window size when the mobile station is on the traffic channel is 60 PN chips, every ½ chip is a time hypothesis, and there are two multipath signals. Searching three pilots independently means that the mobile station has to check 120*3= 360 hypotheses. Using the method above, the mobile station will check 120+8*2=136 hypotheses.

Signal Bearing Medium

The methods discussed above may be implemented, for example, by operating the apparatuses disclosed to execute a sequence of machine-readable instructions. These instructions may reside in various types of signal bearing media. In this respect, one aspect of the present invention concerns an article of manufacture, comprising a signal bearing medium tangibly embodying a program of machine readable instructions executable by a digital signal processing device to perform method steps to reduce the search time for acquiring multiple carriers.

This signal bearing medium may comprise, for example, RAM contained within the apparatus. Alternatively, the instructions may be contained in another type of signal bearing medium, such as a magnetic storage diskette 800 shown in FIG. 8. Regardless of where it is physically located, the signal bearing media could be a conventional style hard drive, magnetic tape, an optical medium, CD-ROM, or other signal bearing media. In an illustrative embodiment of the invention, the machine-readable instructions may comprise lines of compiled C-type computer language, or other languages used in the art.

Other Embodiments

While there have been shown what are presently considered to be exemplary embodiments of the invention, it will be apparent to those skilled in the art that various changes and modifications can be made without departing from the scope of the invention as defined by the appended claims.

Figure 5:
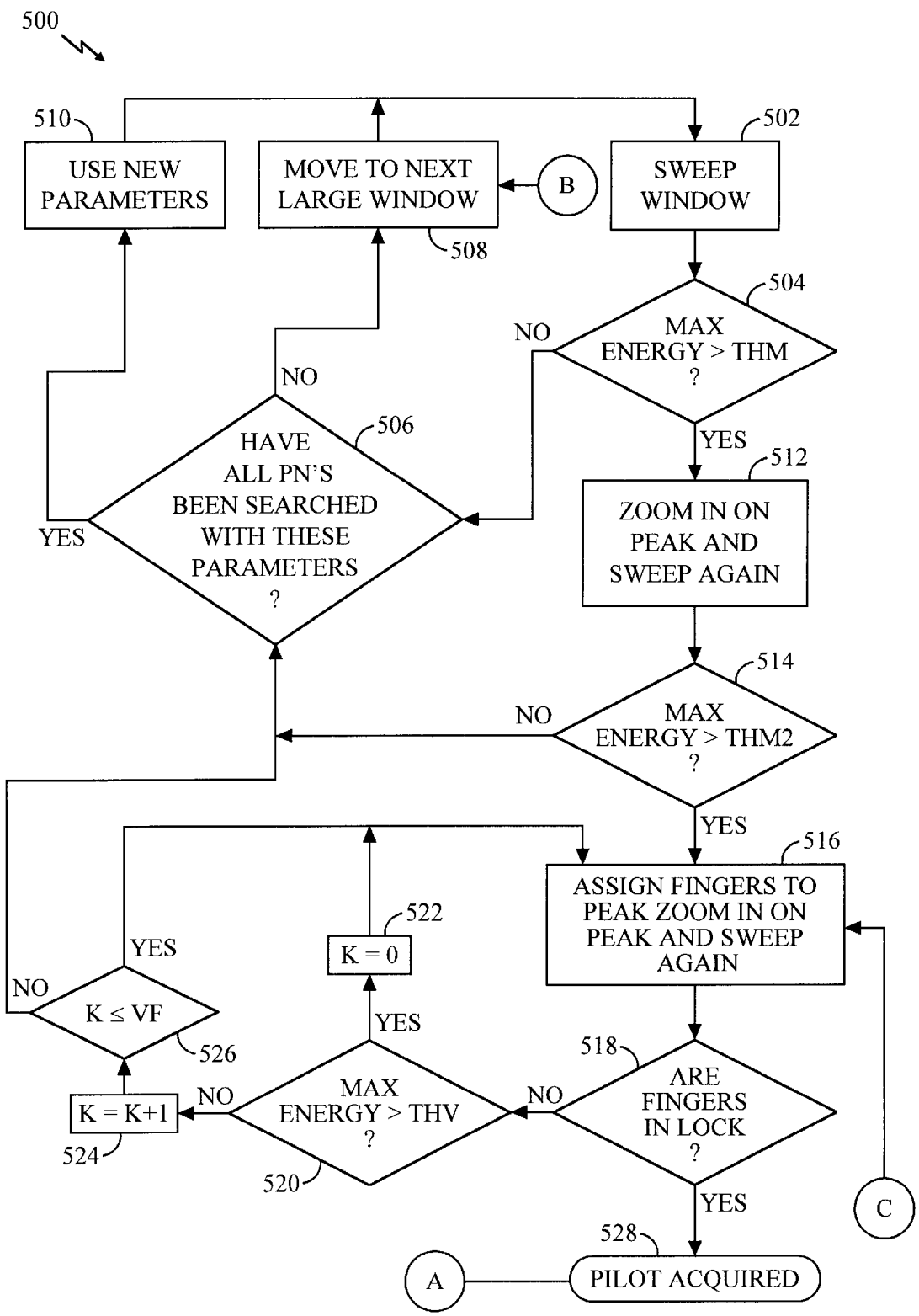
FIG. 5 is a flow chart of a variable window search method used in accordance with on 6 embodiment of the present invention.

Referring to FIG. 5, the following steps may be performed in accordance with various embodiments of the invention.

step 502 sweep window, next step 504 is max energy greater than threshold (THM), if Yes, next step 512 zoom in on peak and sweep again, next step 514 is max energy greater than threshold (THM 2), if Yes, next step 516 assign fingers to peak, zoom in on peak and sweep again, next step 518 are fingers locked, if yes, next step 528 pilot acquired;

if No, at steps 504 and 514, next step 506 have all PN's been searched with these parameters, if Yes move to step 510, if No, move to step 508 step 510 use new parameters, next move to step 502;

step 508 move to next large window, next move to step 502;

if No, at step 518, next step 520 is max energy greater than threshold (THV), if Yes move to step 522, if No move to step 524;

step 522 set K=0, next move to step 516;

step 524 set K=K+1, next step 526 is K less than or equal to threshold (VF), if Yes move to step 516, if No move to step 506.

Figure 7:
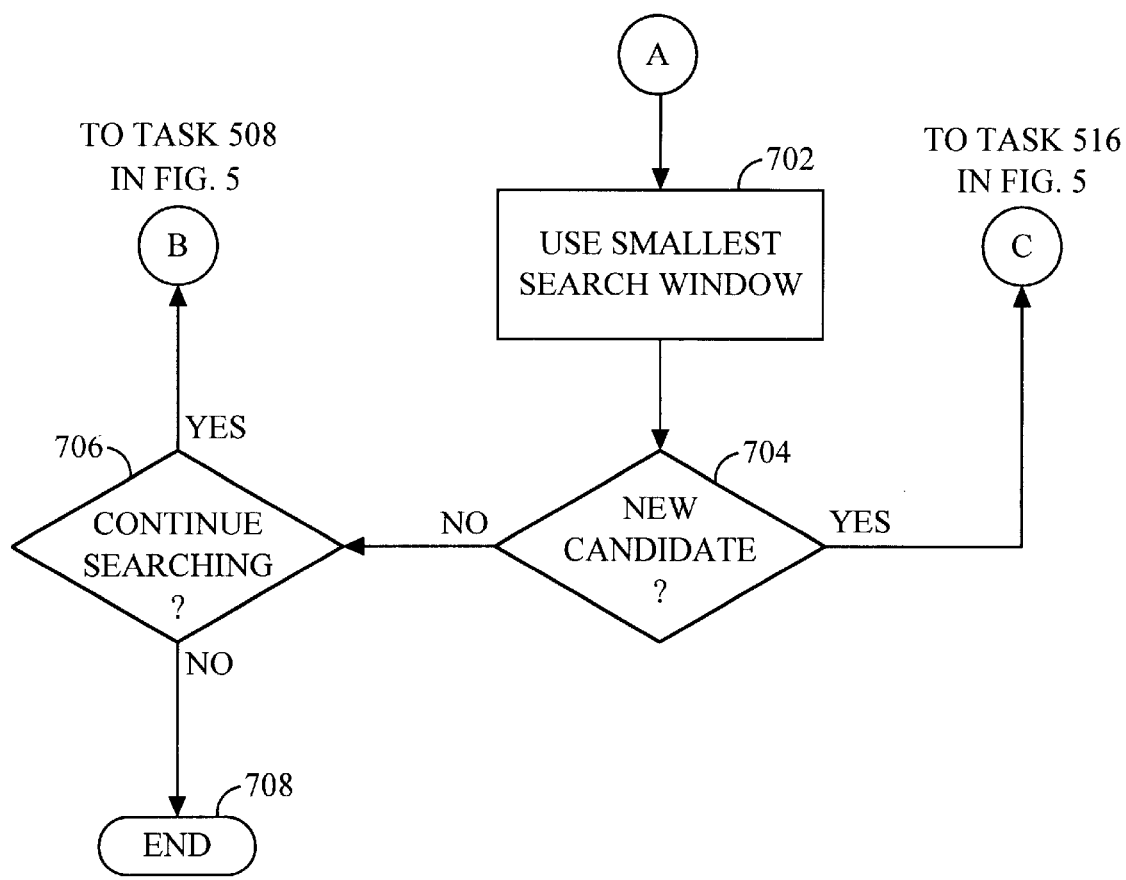
FIG. 7 is a continuation of FIG. 5 and shows a variable window search method used in accordance with one embodiment of the present invention.
Figure 8:
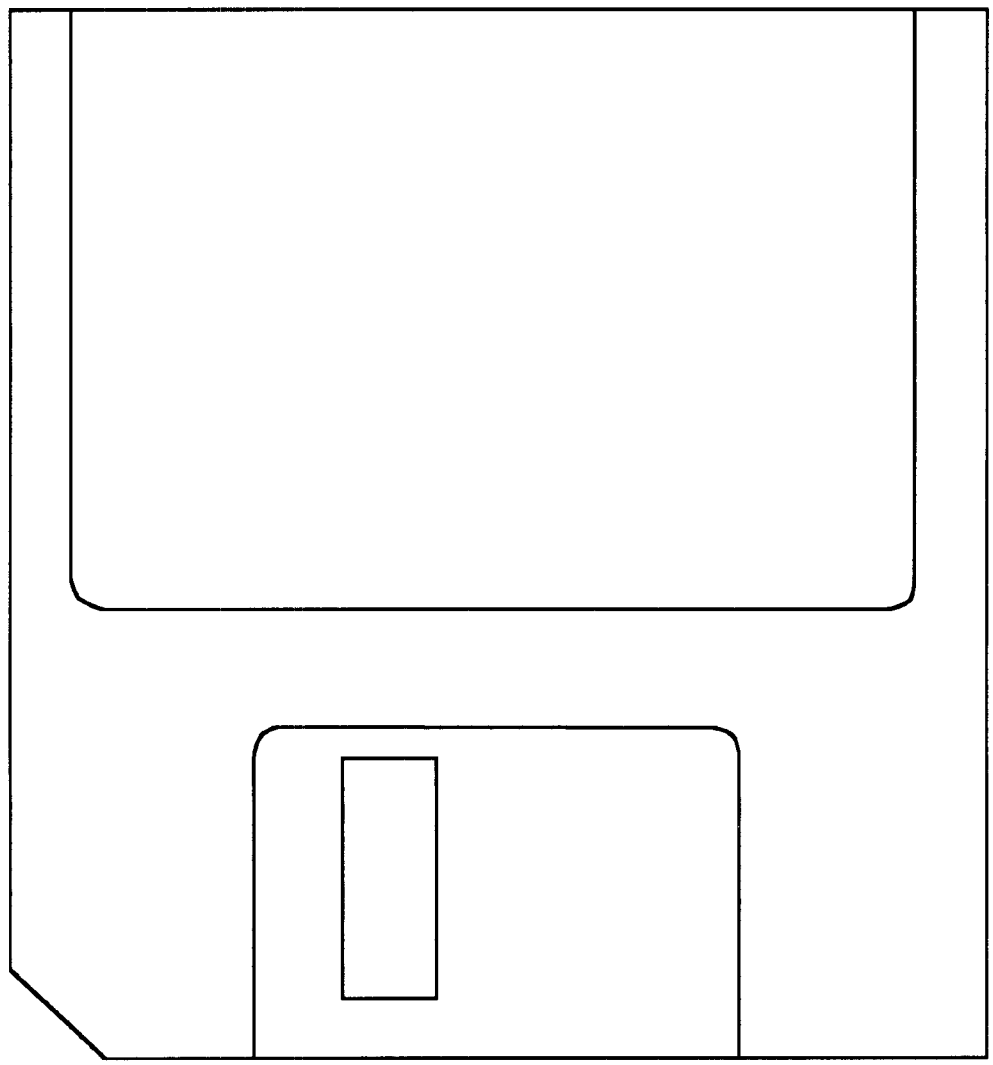
FIG. 8 shows a signal bearing medium in accordance with one embodiment of the present invention.

Referring to FIG. 7, from step 528 shown in FIG. 5, the following steps maybe followed:

step 702 use the smallest search window, next step 704 determining if a new candidate, if Yes to step 516 shown in FIG. 5, if No, next step 706 determining whether to continue searching, if Yes to step 508 shown in FIG. 5, if No, next step 708 end.

In accordance with an embodiment, a method and apparatus provide for to reducing search time for acquiring multiple carriers. Various aspects of the embodiment includes:

(a) receiving a signal associated with a carrier;

(b) demodulating the signal to provide signal metrics;

(c) determining whether or not the signal metrics are defined within the boundaries of a window;

(d) if the signal metrics are defined within the window, further demodulating the signal to provide additional signal metrics, the additional signal metrics used to determine whether or not the signal is defined within the boundaries of a smaller: window (602) and accessible by a designated user; and (e) if the signal is accessible by the designated user, using the smaller window (602) to search for other signals associated with related carriers and accessible by the designated user.

What is claimed is:

1. A method to reduce search time for acquiring multiple carriers, comprising:

using sequentially smaller search windows to identify a first carrier, wherein the sequentially smaller search windows is a sequence of narrowly defined search windows; and using the smallest of the sequentially smaller search windows used to identify the first carrier is used to identify other carriers in the multiple carriers in a multi-carrier communications network.

2. The method as recited in claim 1, further comprising:

determining a quality metric for the other carriers based upon a signal quality metric determined for the first carrier.

3. The method as recited in claim 1, wherein a narrowly defined search window comprises a subset of a plurality of periodic binary (PN) sequences contained in each search window of the sequentially smaller search windows.

4. The method in accordance with claim, 1, wherein if using the smallest of the sequentially smaller search windows fails to identify a second carrier of the other carriers in the multiple carriers, using a sequentially larger search window that was used in identifying the first carrier to identify the second carrier.

5. A method to reduce search time for acquiring multiple carriers, comprising:

(a) receiving a signal associated with a first carrier;

(b) demodulating the signal to provide signal metrics;

(c) determining whether or not the signal metrics are defined within the boundaries of a search window;

(d) if the signal metrics are defined within the search window, further demodulating the signal to provide additional signal metrics, the additional signal metrics used to determine whether or not the signal is defined within the boundaries of a smaller window; and (e) if the signal is accessible by a designated user, using the smaller window to search for other signals associated with related carriers in the multiple carrier and accessible by the designated user.

6. The method in accordance with claim 5, further comprising:

if the signal metrics are not defined within the window, repeating the steps (a)–(c) with a different received signal.

7. The method in accordance with claim 5, further comprising the steps of:

reporting a received signal quality metric for the first carrier, the signal quality metric communicated from the user to a transmission station; and determining a quality metric for the other related carriers based upon the signal quality metric for the first carrier.

8. The method in accordance with claim 5, wherein the search window is for duration of a plurality of periodic binary (PN) sequences, and the smaller window is for duration of a subset of the PN sequences contained in the search window.

9. An apparatus for reducing search time for acquiring multiple carriers, comprising:

means for using sequentially smaller search windows to identify a first carrier, wherein the sequentially smaller search windows is a sequence of narrowly defined search windows;

means for using the smallest of the sequentially smaller search windows used to identify the first carrier is used to identify other carriers in the multiple carriers in a multi-carrier communications network.

10. The apparatus as recited in claim 9, further comprising:

means for determining a quality metric for the other carriers based upon a signal quality metric determined for the first carrier.

11. The apparatus as recited in claim 9, wherein a narrowly defined search window comprises a subset of a plurality of periodic binary (PN) sequences contained in each search window of the sequentially smaller search windows.

12. The apparatus in accordance with claim 9, wherein if using the smallest of the sequentially smaller search windows fails to identify a second carrier of the other carriers in the multiple carriers, using a sequentially larger search window that was used in identifying the first carrier to identify the second carrier.

13. An apparatus for reducing search time for acquiring multiple carriers, comprising:

(a) means for receiving a signal associated with a first carrier;

(b) means for demodulating the signal to provide signal metrics;

(c) means for determining whether or not the signal metrics are defined within the boundaries of a search window;

(d) means for, if the signal metrics are defined within the search window, further demodulating the signal to provide additional signal metrics, the additional signal metrics used to determine whether or not the signal is defined within the boundaries of a smaller window; and (e) means for, if the signal is accessible by a designated user, using the smaller window to search for other signals associated with related carriers in the multiple carrier and accessible by the designated user.

14. The apparatus in accordance with claim 13, further comprising:

means for, if the signal metrics are not defined within the window, repeating the operations (a)–(c) with a different received signal.

15. The apparatus in accordance with claim 13, further comprising of:

means for reporting a received signal quality metric for the first carrier, the signal quality metric communicated from the user to a transmission station; and means for determining a quality metric for the other related carriers based upon the signal quality metric for the first carrier.

16. The apparatus as recited in claim 13, wherein the search window is for duration of a plurality of periodic binary (PN) sequences, and the smaller window is for duration of a subset of the PN sequences contained in the search window.

* * * * *